United States Patent [19]

Miller

[11] 4,041,792
[45] Aug. 16, 1977

[54] DRIVE DISCONNECT DEVICE

[75] Inventor: Calvin L. Miller, Aurora, Ill.

[73] Assignee: Caterpillar Tractor Co., Peoria, Ill.

[21] Appl. No.: 737,642

[22] Filed: Nov. 1, 1976

[51] Int. Cl.² ........................................... F16H 57/00
[52] U.S. Cl. ................................................... 74/405
[58] Field of Search ......................................... 74/405

[56] References Cited
U.S. PATENT DOCUMENTS 3,835,722  9/1974  Bertram et al. ......................... 74/405

Primary Examiner—Leonard H. Gerin
Attorney, Agent, or Firm—John W. Grant

[57] ABSTRACT

A power train includes a rotary driving member normally engaged with a rotary driven shaft through a spline connection to transmit power therebetween. A cage threadably extends through a threaded bore in the housing and is rotatably attached to the driven shaft so that rotation of the cage slidably moves the driven shaft from the engaged position of the spline connection to disengaged the spline connection. A yieldable stop means is secured to the cage for engagement with the housing to provide an indication of when the spline connection is disengaged.

3 Claims, 3 Drawing Figures

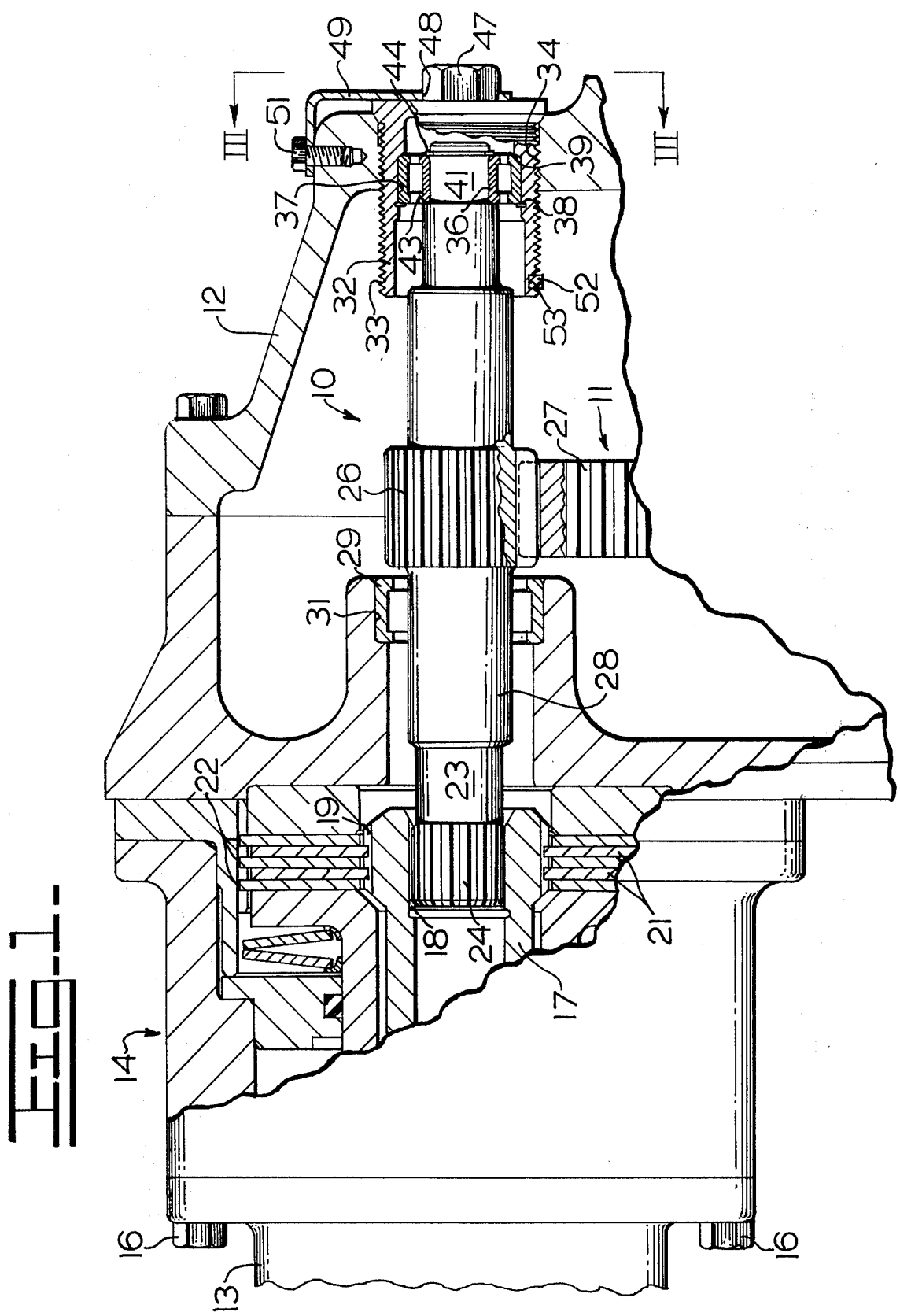

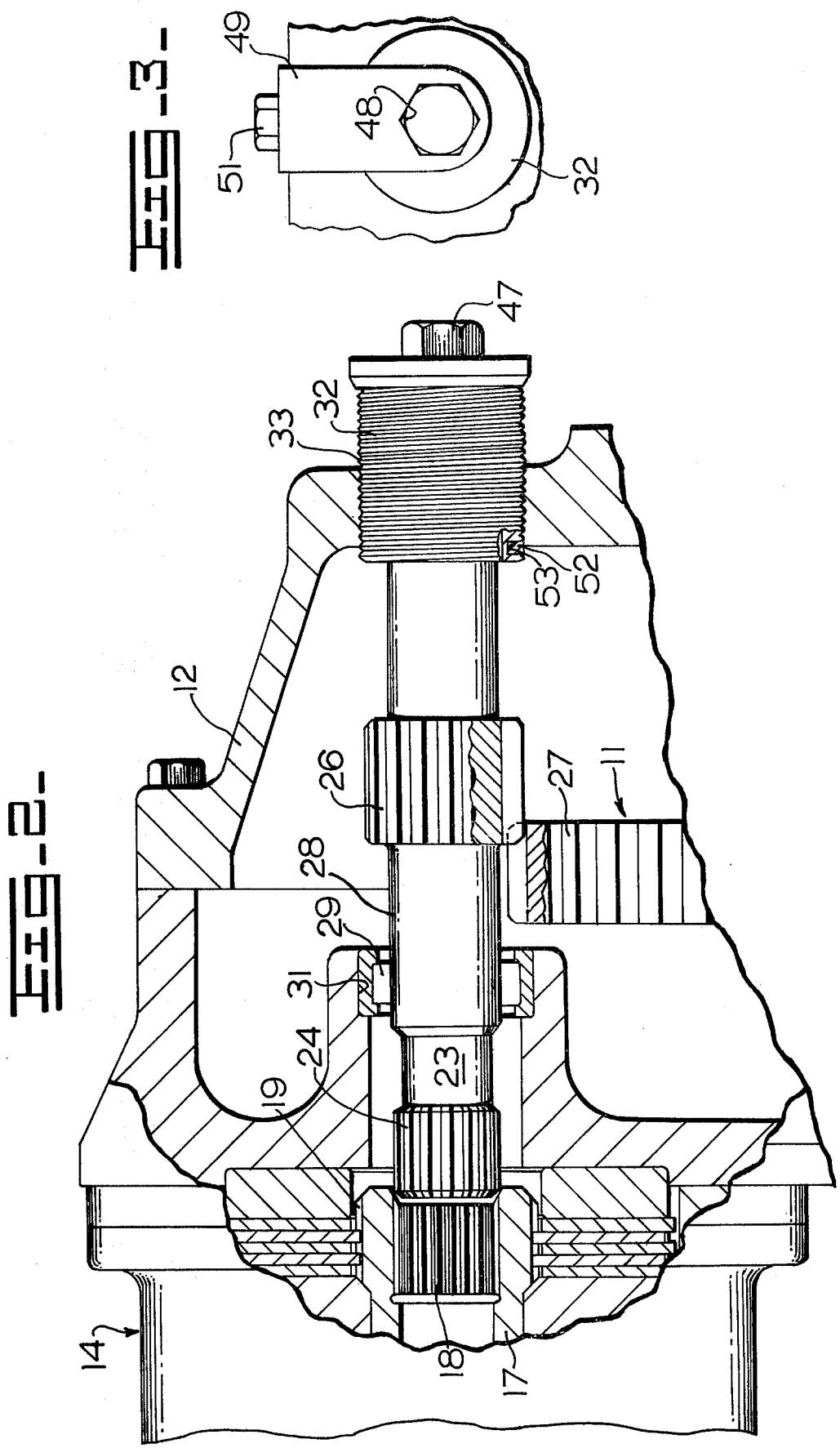

DRIVE DISCONNECT DEVICE

BACKGROUND OF THE INVENTION

It is frequently desirable to disconnect a final drive for a track-type vehicle when the vehicle is being towed. Although the transmission for the vehicle is normally placed in neutral during towing, hydrostatic motors sometimes employed in the vehicle's final drive remain operatively connected to the drive sprockets or the tracks. Thus, the motors are driven by the sprockets during towing which may result in damage to the motors due to lubricant starvation and frictional drag occasioned between the rotating components thereof.

In addition, a normally engaged and hydraulically released brake is usually integrated into the final drive. Since the vehicle's power plant may be nonoperative during the towing, the brake can not be released hydraulically unless special release mechanisms are employed therefor.

OBJECTS OF THE INVENTION

Accordingly, an object of this invention is to provide an improved drive disconnect device with which rotary driving and driven members may be selectively disengaged.

Another object of this invention is to provide such an improved drive disconnect device of rugged construction which is economical to manufacture and which can be easily disconnected.

Other objects and advantages of this invention will become more readily apparent upon reference to the accompanying drawing and following description.

BRIEF DESCRIPTION OF THE DRAWINGS

FIG. 1 is a sectional view of the drive disconnect device embodying the principles of the present invention as shown in the engaged position.

FIG. 2 is a sectional view of the drive disconnect device in the disengaged position.

FIG. 3 is an elevational view of one end of the drive disconnect device as viewed along line III—III of FIG. 1.

DESCRIPTION OF THE PREFERRED EMBODIMENT

Referring to the drawings, a drive disconnect device embodying the principles of the present invention is generally illustrated by the reference numeral 10 operatively associated with a final drive, partially shown at 11, employed in a power train for a track-type vehicle, not shown. The drive disconnect device and final drive are contained in a common housing 12. A hydrostatic motor, partially shown at 13, and a normally engaged brake assembly 14 are attached together and to the housing by a plurality of circumferentially disposed bolts 16. The motor may be selectively actuated by hydraulic control means (not shown) to supply input power to the final drive through an input or drive sleeve 17 and the disconnect device. The sleeve is provided with internal splines at 18 and external splines at 19. The brake assembly, normally spring engaged and adapted to be hydraulically released in the usual manner, includes a plurality of rotatable friction discs 21 mounted for limited axial movement on the external splines 19. A plurality of nonrotatable friction discs 22 are alternately interleaved with the friction disc 21 and cooperate therewith to hold the drive sleeve stationary when the brake is engaged. When the brake is released hydraulically, the drive sleeve is permitted to rotate.

An elongated output or driven shaft 23 is in axial alignment with the drive sleeve 17 and is provided with external splines 24 on one end and which normally meshes with the internal splines 18 of the drive sleeve. A spur gear 26 is formed on the driven shaft and meshes with a spur gear 27, partially shown at 27. The spur gear 27 is one of the gears making up the gear train of the final drive. A smooth bearing surface 28 is formed on the driven shaft between the external spline 18 and the spur gear and is rotatably supported in a roller bearing 29 suitably seated in a bore 31 formed in the housing 12.

A hollow cage 32 has an external thread 33 formed thereon and threadably extending through a threaded bore 34 formed in the housing 12 in axial alignment with the driven shaft 23 and the drive sleeve 17. A roller bearing 36 is seated in a bore 37 formed in the cage and retained therein at a fixed axial position relative to the cage by a snap ring 38 seated in an annular groove formed in the cage and an annular shoulder 39 at the end of the bore 37. A radially extending flange 40 is formed on the outer end of the cage and sealingly engages the housing 12 in the engaged position shown in FIG. 1. A reduced diameter bearing portion 41 is formed on the opposite end of the driven shaft and is rotatably supported by the roller bearing 36. An annular shoulder 43 formed on the driven shaft is maintained in abutment with the bearing by a snap ring 44 seated in an annular groove formed in the shaft. Thus, the driven shaft is fixed axially relative to the cage while the shaft may freely rotate relative to the cage or vice versa.

A multi-sided protruberance 47 on the outwardly extending end of the cage 32 and normally extends through a milti-sided opening 48 in an L-shaped retaining member 49 which is removably attached to the housing 12 by a bolt 51. In the engaged position shown in FIG. 1, the retaining member prevents rotation of the cage thereby retaining it and the driven shaft in the engaged position. A yieldable insert or stop 52 is secured within a pocket 53 formed in the external threads 33 of the cage adjacent to the inner end of the cage.

During vehicle operation, the driven shaft 23 is positioned as shown in FIG. 1 to continuously maintain internal splines 18 and external splines 24 in meshed relationship. The hydrostatic motor 13 functions to selectively drive the drive sleeve 17 which in turn drives the driven shaft 23 such that the spur gear 26 drives the spur gear 27 of the final drive.

As shown in FIG. 2 when it is desirable to tow the vehicle to a service facility, for example, the driven shaft 23 is shifted to a second or disengaged position to disengage the external splines 24 of the driven shaft from the internal splines 18 of the drive sleeve 17. Such disengagement interrupts the drive train to prevent the final drive from imparting rotation to the drive sleeve 17, brake assembly 14 and hydrostatic motor 13. Such disengagement is accomplished by first removing the retainer member 49 and then rotating the cage in a first direction with an appropriate tool fitted on the multi-sided protruberance 47. Upon rotation of the cage the threaded connection between the cage and the housing causes the cage to move axially and simultaneously moves the driven shaft in an axial direction to the right to disengage the external splines 24 from the internal splines 18. The cage is rotated until the yieldable insert 52 engages the housing thereby increasing the rotating resistance of the cage. The insert is positioned so that it engages the housing only after disengagement of the splined connection and before the spur gear 26 becomes disengaged from the spur gear 27. However, should it become necessary to completely remove the driven shaft when servicing or repairing the final drive, the resistance afforded by the yieldable insert can be overcome and the cage completely removed from the threaded bore.

When it is desired to reengage the external splines 24 with the internal splines 18 from the disengaged position shown in FIG. 2, the cage 32 is rotated in the opposite direction so that the cage and driven shaft 23 are moved in an axial direction to the left. The flange 40 abutting with the housing 12 serves to locate the driven shaft in the engaged position. The retainer member 49 is then secured in place with the bolt 51 to maintain the cage in its fixed position with the drive disconnect in the engaged position.

While the invention has been described and shown with particular reference to the preferred embodiment, it will be apparent that variations might be possible that would fall within the scope of the present invention, which is not intended to be limited except as defined in the following claims.

What is claimed is:

1. A drive disconnect device for a power train of the type contained within a housing and having a rotary driving member normally engaged with a rotary driven shaft through a spline connection to transmit power therebetween, the drive disconnect device comprising:
   means forming a threaded bore in the housing in alignment with the driven shaft;
   a cage having an external thread formed thereon and threadably extending through the threaded bore;
   means for rotatably attaching the driven shaft to the cage so that rotating the cage slidably moves the driven shaft in an axial direction from said engaged position of the spline connection to a disengaged position of the spline connection; and
   yieldable stop means disposed within the external thread of the cage and engageable with the housing when the driven shaft reaches the disengaged position to provide increased resistance to the rotation of the cage.

2. The drive disconnect device of claim 1 wherein the yieldable stop means is deformable sufficiently to permit complete removal of the cage from the threaded bore.

3. The drive disconnect device of claim 2 including a multi-sided protruberance formed on the cage and a retainer engageable with the multi-sided protruberance and detachably mounted to the housing to retain the cage in a fixed position.

* * * * *